United States Patent
Bidner et al.

(10) Patent No.: US 9,181,882 B2
(45) Date of Patent: Nov. 10, 2015

(54) EMISSIONS CONTROL DURING AN AUTOMATIC ENGINE RESTART

(71) Applicant: Ford Global Technologies, LLC, Dearborn, MI (US)

(72) Inventors: David Karl Bidner, Livonia, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 453 days.

(21) Appl. No.: 13/665,699

(22) Filed: Oct. 31, 2012

(65) Prior Publication Data

US 2014/0121951 A1    May 1, 2014

(51) Int. Cl.
| | | |
|---|---|---|
| F02B 7/00 | (2006.01) | |
| F02D 29/02 | (2006.01) | |
| F02M 25/022 | (2006.01) | |
| F02D 17/04 | (2006.01) | |
| F02M 25/028 | (2006.01) | |
| F02D 41/06 | (2006.01) | |
| F02D 13/02 | (2006.01) | |
| F02B 75/12 | (2006.01) | |
| F02N 11/08 | (2006.01) | |
| F02D 41/04 | (2006.01) | |

(52) U.S. Cl.
CPC ............. *F02D 29/02* (2013.01); *F02D 17/04* (2013.01); *F02D 41/065* (2013.01); *F02M 25/028* (2013.01); *F02M 25/0227* (2013.01); *F02B 2075/125* (2013.01); *F02D 13/0207* (2013.01); *F02D 13/0219* (2013.01); *F02D 13/0265* (2013.01); *F02D 41/042* (2013.01); *F02D 2200/021* (2013.01); *F02N 11/0818* (2013.01); *Y02T 10/123* (2013.01)

(58) Field of Classification Search
CPC .......... F02D 2041/0095; F02D 41/042; F02D 41/0087; F02D 41/062; F02N 11/0814; Y02T 10/48; F01L 2800/01; F01L 9/04
USPC ........... 123/298, 90.15, 345–348, 25 A, 25 C, 123/179.3, 179.4, 179.7, 179.13, 179.15, 123/179.16, 179.17, 435; 701/112, 113
See application file for complete search history.

(56) References Cited

U.S. PATENT DOCUMENTS

| | | | |
|---|---|---|---|
| 6,477,831 B1 | 11/2002 | Ballinger et al. | |
| 6,892,680 B2 | 5/2005 | Lee | |
| 2007/0131188 A1* | 6/2007 | Hokuto | 123/179.4 |
| 2008/0066706 A1* | 3/2008 | Nakamura et al. | 123/179.4 |
| 2012/0138014 A1* | 6/2012 | Gibson et al. | 123/294 |
| 2012/0253633 A1* | 10/2012 | Anzawa | 701/102 |
| 2015/0025780 A1* | 1/2015 | Gibson et al. | 701/105 |

FOREIGN PATENT DOCUMENTS

EP      0586891 A1    3/1994

\* cited by examiner

*Primary Examiner* — Hai Huynh
*Assistant Examiner* — Gonzalo Laguarda
(74) *Attorney, Agent, or Firm* — Julia Voutyras; Alleman Hall McCoy Russell & Tuttle LLP (57) ABSTRACT

Embodiments for performing an automatic stop-start operation are provided. In one example, a method for an engine comprises during an automatic stop, injecting a water-containing fluid onto a closed intake valve of a cylinder while the engine is at rest, and on a subsequent restart, fueling the cylinder after at least one intake stroke and subsequent exhaust stroke are performed in the cylinder.

18 Claims, 5 Drawing Sheets

EMISSIONS CONTROL DURING AN AUTOMATIC ENGINE RESTART

FIELD

The present disclosure relates to an internal combustion engine.

BACKGROUND AND SUMMARY

Vehicle manufacturers have realized that it may be desirable under some conditions to automatically start and stop an engine of a vehicle. Stopping the engine can reduce fuel consumption, especially when the vehicle is stopped for longer periods of time, in stop-and-go traffic for example. However, during an automatic stop, a catalyst positioned in the exhaust downstream of the engine may become oxidized. Due to the catalyst being saturated with oxygen, water may not be available in the catalyst for the formation of hydrogen, which is used to control NOx upon a subsequent engine restart, thus degrading emissions.

The inventors have recognized the issues with the above approach and have developed an approach for improving emissions during an automatic engine start. In one embodiment, a method for an engine comprises during an automatic stop, injecting a water-containing fluid onto a closed intake valve of a cylinder while the engine is at rest, and on a subsequent restart, fueling the cylinder after at least one intake stoke and subsequent exhaust stroke are performed in the cylinder.

By injecting a water-containing fluid onto a hot, closed intake valve, the water may vaporize and be passed to the catalyst during a following intake stroke. By doing so, intake air may be displaced by the vaporized water in the cylinder, and the non-combusted exhaust reaching the catalyst prior to the initiation of combustion may be depleted of oxygen, reducing the saturation of oxygen in the catalyst. Further, the vaporized water-containing fluid may contribute water to the catalyst for hydrogen formation. In this way, emissions may be controlled during an automatic engine restart operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

During automatic engine stop-start operation, the catalyst in the exhaust may become oxidized and depleted of water. These catalyst conditions may reduce the efficiency of NOx conversion during the engine start. To reduce the amount of oxygen in the catalyst and/or increase the amount of available water, a water-containing fluid may be injected onto a closed intake valve while the engine is at rest, prior to an engine restart, in order to vaporize the fluid. Then, during engine cranking, the vaporized fluid may be inducted into the cylinder and exhausted to the catalyst. The vaporized fluid may displace a volume of air in the catalyst, reducing the oxygen reaching the catalyst. Following the passing of the vaporized fluid to the catalyst, combustion may be initiated.

Figure 1:
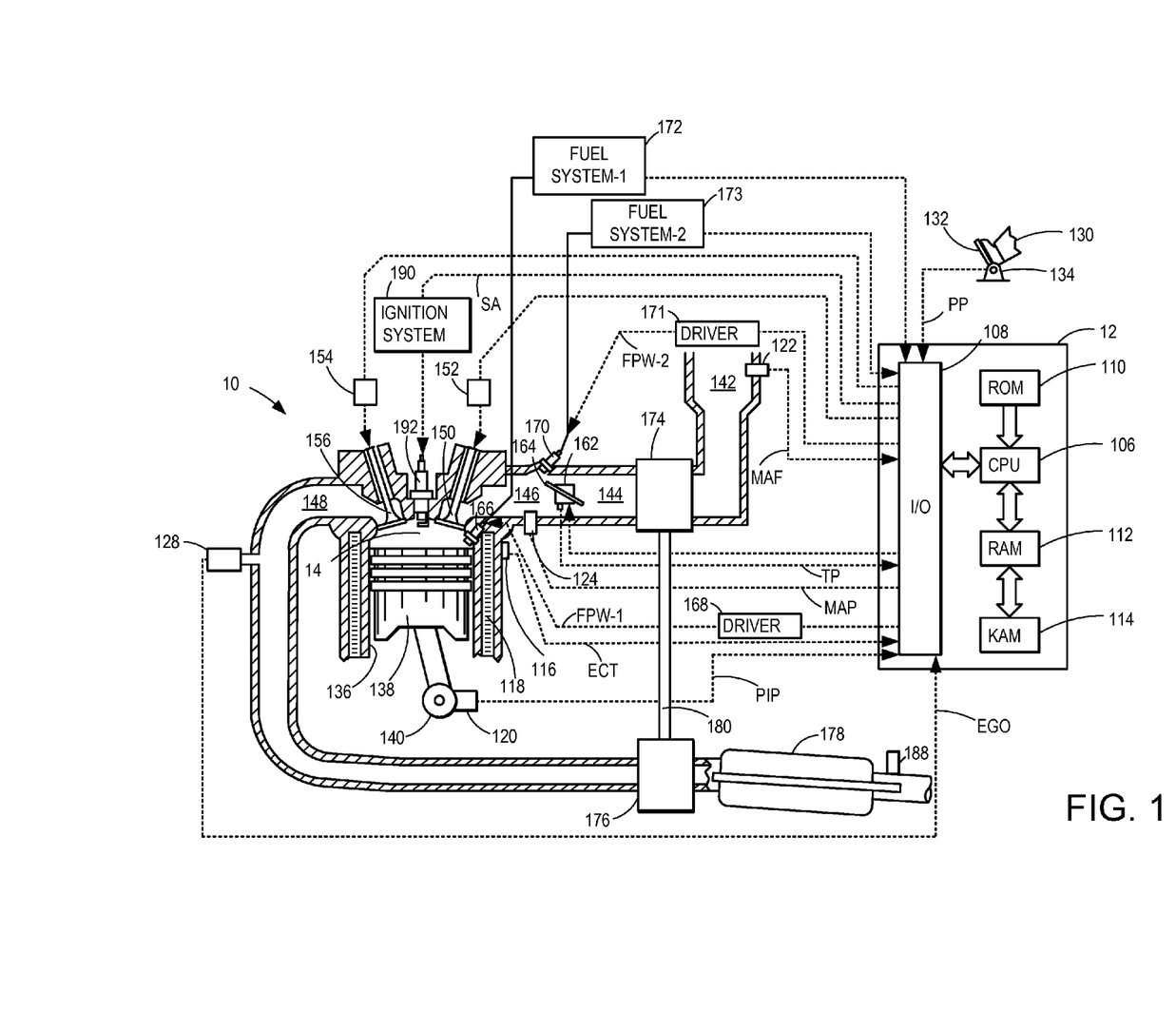
FIG. 1 is a schematic diagram of an engine.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more injectors for providing fuel or other liquids thereto. As a non-limiting example, cylinder 14 is shown including two injectors 166 and 170. Injector 166 is shown coupled directly to cylinder 14 for injecting fuel directly therein in proportion to the pulse width of signal FPW-1 received from controller 12 via electronic driver 168. In this manner, injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system-1 172 including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Injector 170 is shown arranged in intake passage 146, rather than in cylinder 14, in a configuration that provides what is known as port injection of fuel or other fluids (hereafter referred to as "PFI") into the intake port upstream of cylinder 14. Injector 170 may inject water, washer fluid, or fuel in proportion to the pulse width of signal FPW-2 received from controller 12 via electronic driver 171. Liquid may be delivered to fuel injector 170 by fuel system-2 173 including a tank, a pump, and a rail. Note that a single driver 168 or 171 may be used for both injection systems, or multiple drivers, for example driver 168 for injector 166 and driver 171 for injector 170, may be used, as depicted.

Fuel may be delivered by both injectors to the cylinder during a single cycle of the cylinder. For example, each injector may deliver a portion of a total fuel injection that is combusted in cylinder 14. However, as described in more detail below, in some embodiments, fuel may be delivered by injector 168 to the cylinder for combustion during each engine cycle, while water, washer fluid, or other non-fuel liquid may be delivered to a closed intake valve by injector 170 prior to an automatic start of the engine.

As described above, FIG. 1 shows only one cylinder of a multi-cylinder engine. As such each cylinder may similarly include its own set of intake/exhaust valves, fuel injector(s), spark plug, etc.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140 sensing crankshaft 140 position; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants In some embodiments, the engine may be coupled to an electric motor/battery system in a hybrid vehicle. The hybrid vehicle may have a parallel configuration, series configuration, or variation or combinations thereof. Further, in some embodiments, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 14 via intake manifold 146, and piston 138 moves to the bottom of the cylinder so as to increase the volume within combustion chamber 14. The position at which piston 138 is near the bottom of the cylinder and at the end of its stroke (e.g. when combustion chamber 14 is at its largest volume) is typically referred to by those of skill in the art as bottom dead center (BDC). During the compression stroke, intake valve 52 and exhaust valve 54 are closed. Piston 138 moves toward the cylinder head so as to compress the air within combustion chamber 14. The point at which piston 138 is at the end of its stroke and closest to the cylinder head (e.g. when combustion chamber 14 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 192, resulting in combustion. During the expansion stroke, the expanding gases push piston 138 back to BDC. Crankshaft 140 converts piston movement into a rotational torque of the rotary shaft. Finally, during the exhaust stroke, the exhaust valve 54 opens to release the combusted air-fuel mixture to exhaust manifold 148 and the piston returns to TDC. Note that the above is shown merely as an example, and that intake and exhaust valve opening and/or closing timings may vary, such as to provide positive or negative valve overlap, late intake valve closing, or various other examples.

In one embodiment, the stop/start crank position sensor has both zero speed and bi-directional capability. In some applications a bi-directional Hall sensor may be used, in others the magnets may be mounted to the target. Magnets may be placed on the target and the "missing tooth gap" can potentially be eliminated if the sensor is capable of detecting a change in signal amplitude (e.g., use a stronger or weaker magnet to locate a specific position on the wheel). Further, using a bi-dir Hall sensor or equivalent, the engine position may be maintained through shut-down, but during re-start alternative strategy may be used to assure that the engine is rotating in a forward direction.

Thus, the system of FIG. 1 provides for an engine system comprising an engine including a cylinder having an intake valve; a port injector for injecting liquid into the cylinder; and a controller with computer readable instructions for injecting a water-containing liquid from the port injector onto the intake valve during an automatic engine stop.

The controller may include instructions for injecting the water-containing liquid onto the intake valve when the intake valve is closed. The system may include a direct injector for injecting fuel into the cylinder, and the controller may include instructions for injecting fuel from the direct injector after injecting the water-containing liquid from the port injector and after a subsequent intake stroke and exhaust stroke are performed in the cylinder. The controller may include instructions for injecting fuel from the port injector after injecting the water-containing liquid from the port injector and after a subsequent intake stroke and exhaust stroke are performed in the cylinder.

Figure 2:
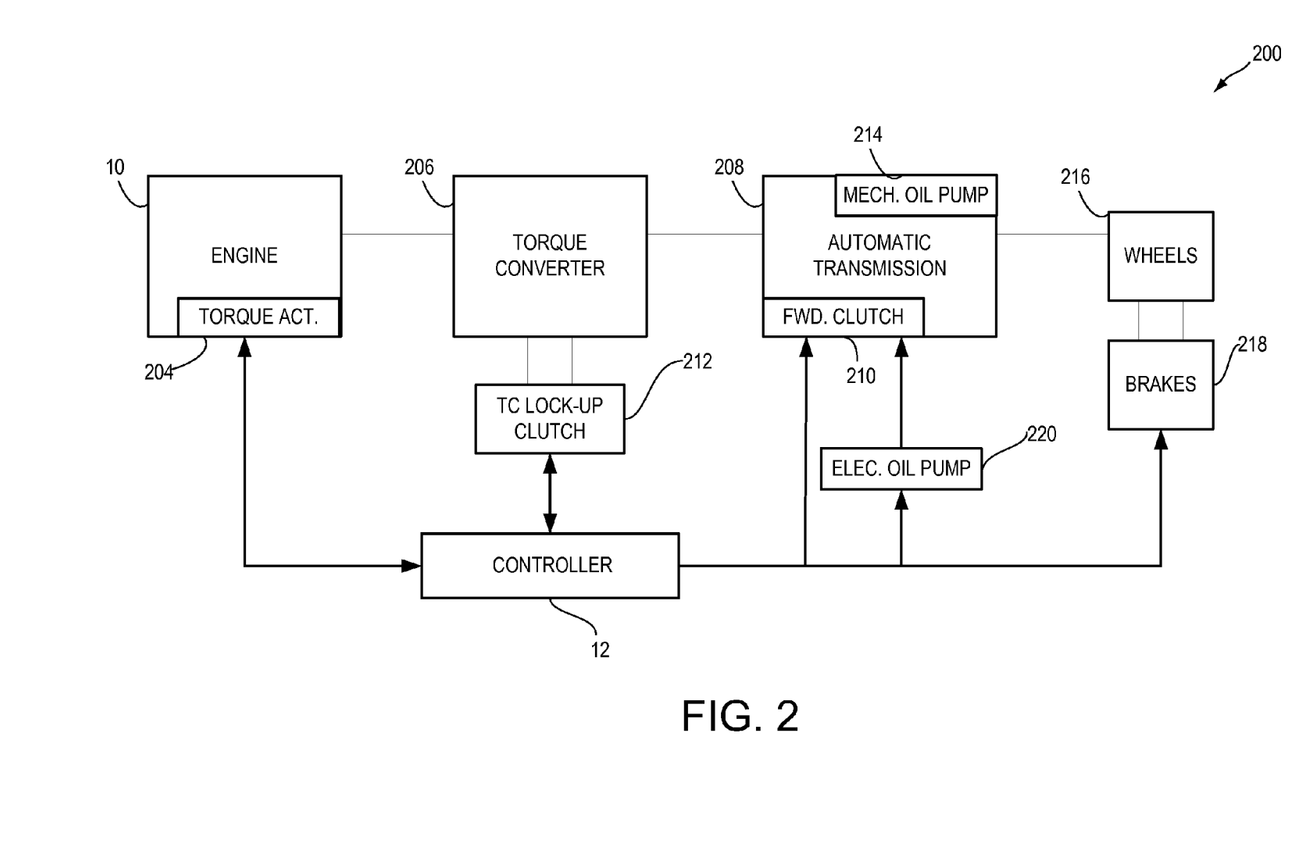
FIG. 2 is shows an example vehicle system layout.

FIG. 2 is a block diagram of a vehicle drive-train 200. Drive-train 200 may be powered by engine 10. Engine 10 may be started with an engine starting system (not shown). Further, engine 10 may generate or adjust torque via torque actuator 204, such as a fuel injector, throttle, etc.

An engine output torque may be transmitted to torque converter 206 to drive an automatic transmission 208. Further, one or more clutches may be engaged, including forward clutch 210, to propel a vehicle. In one example, the torque converter may be referred to as a component of the transmission. Further, transmission 208 may include a plurality of gear clutches that may be engaged as needed to activate a plurality of fixed transmission gear ratios. The output of the torque converter may in turn be controlled by torque converter lock-up clutch 212. For example, when torque converter lock-up clutch 212 is fully disengaged, torque converter 206 transmits engine torque to automatic transmission 208 via fluid transfer between the torque converter turbine and torque converter impeller, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque relayed to the transmission to be adjusted. A controller may be configured to adjust the amount of torque transmitted by torque converter 212 by adjusting the torque converter lock-up clutch in response to various engine operating conditions, or based on a driver-based engine operation request.

Torque output from the automatic transmission 208 may in turn be relayed to wheels 216 to propel the vehicle. Specifically, automatic transmission 208 may transfer an input driving torque at the input shaft (not shown) responsive to a vehicle traveling condition before transmitting an output driving torque to the wheels.

Further, a frictional force may be applied to wheels 216 by engaging wheel brakes 218. In one example, wheel brakes 218 may be engaged in response to the driver pressing his foot on a brake pedal (not shown). In the same way, a frictional force may be reduced to wheels 216 by disengaging wheel brakes 218 in response to the driver releasing his foot from a brake pedal. Further, vehicle brakes may apply a frictional force to wheels 216 as part of an automated engine stopping procedure.

A mechanical oil pump 214 may be in fluid communication with automatic transmission 208 to provide hydraulic pressure to engage various clutches, such as forward clutch 210 and/or torque converter lock-up clutch 212. Mechanical oil pump 214 may be operated in accordance with torque converter 212, and may be driven by the rotation of the engine or transmission input shaft, for example. Thus, the hydraulic pressure generated in mechanical oil pump 214 may increase as an engine speed increases, and may decrease as an engine speed decreases. An electric oil pump 220, also in fluid communication with the automatic transmission but operating independent from the driving force of engine 10 or transmission 208, may be provided to supplement the hydraulic pressure of the mechanical oil pump 214. Electric oil pump 220 may be driven by an electric motor (not shown) to which an electric power may be supplied, for example by a battery (not shown).

A controller 12 may be configured to receive inputs from engine 10, as shown in more detail in FIG. 1, and accordingly control a torque output of the engine and/or operation of the torque converter, transmission, clutches, and/or brakes. As one example, a torque output may be controlled by adjusting a combination of spark timing, fuel pulse width, fuel pulse timing, and/or air charge, by controlling throttle opening and/or valve timing, valve lift and boost for turbo- or supercharged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output.

When automatic stop conditions are satisfied, controller 12 may initiate engine shutdown by shutting off fuel and spark to the engine. Further, to maintain an amount of torsion in the transmission, the controller may ground rotating elements of transmission 208 to a case of the transmission and thereby to the frame of the vehicle. The controller may engage one or more transmission clutches, such as forward clutch 210, and lock the engaged transmission clutch(es) to the transmission case and vehicle frame. A clutch pressure may be varied (e.g., increased) to adjust the engagement state of a transmission clutch, and provide a desired amount of transmission torsion. In one example, during the engine shutdown, hydraulic pressure for clutch modulation may be provided by enabling the electric oil pump 220, if sufficient hydraulic pressure cannot be provided by the mechanical oil pump 214.

A wheel brake pressure may also be adjusted during the engine shutdown, based on the clutch pressure, to assist in tying up the transmission while reducing a torque transferred through the wheels. Specifically, by applying the wheel brakes while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

When restart conditions are satisfied, and/or a vehicle operator wants to launch the vehicle, controller 12 may reactivate the engine by resuming cylinder combustion. To launch the vehicle, transmission 208 may be unlocked and the wheel brakes 218 may be released, to return torque to the driving wheels 216. A clutch pressure may be adjusted to unlock the transmission, while a wheel brake pressure may be adjusted to coordinate the release of the brakes with the unlocking of the transmission, and a launch of the vehicle.

Figure 3:
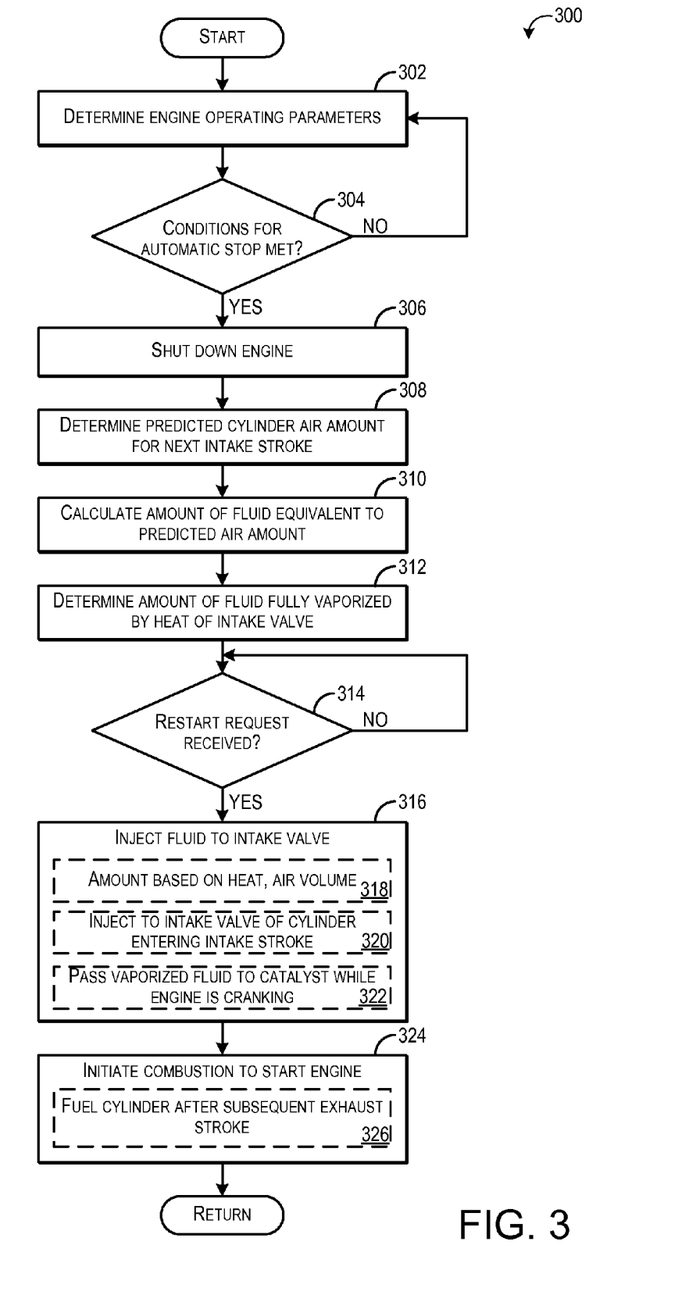
FIG. 3 is a flow chart illustrating an example method for performing an automatic stop-start operation.

Turning now to FIG. 3, a method 300 for performing an automatic stop-start of an engine is illustrated. Method 300 may be carried out by an engine controller according to computer readable instructions stored thereon. Method 300 may improve emissions during an automatic engine restart by injecting a water-containing fluid, such as water or windshield washer fluid, onto a hot, closed intake valve. The fluid may be vaporized by the heat of the intake valve and inducted into a cylinder of the engine. In doing so, air that would normally be inducted is displaced, depleting the catalyst of oxygen and providing water for hydrogen formation.

Method 300 comprises, at 302, determining engine operating parameters. Engine operating parameters may include but are not limited to engine temperature, ambient air temperature, barometric pressure (e.g., an indication of altitude), engine crankshaft position, engine camshaft position, vehicle brake pressure, humidity, engine speed and engine load.

At 304, method 300 judges if conditions for performing an automatic stop have been met. The conditions for performing the automatic stop may include, for example, that the engine is operating (e.g., carrying out combustion), that a state of charge (SOC) of a battery is above a threshold (e.g., greater than 30%), that the vehicle running speed is within a desired range (e.g., no more than 30 mph), and that engine coolant temperature is within a threshold range. Further, the brake pedal may be depressed past a threshold position and/or the accelerator pedal position may be depressed by less than a threshold position, indicating an operator intent to stop the vehicle.

Additionally, the automatic stop may be contingent on the temperature of one or more intake valves of the engine. In order to vaporize the water-containing fluid, the intake valve onto which the fluid is injected may have a temperature higher than the vaporization temperature of the fluid. If the temperature of the intake valve is lower than the vaporization temperature of the fluid, then the automatic stop conditions may not be met, and the stop may not be performed. The temperature of the intake valves may be determined based on a thermal model that estimates intake valve temperature based on engine speed and load and other parameters, such as engine temperature and charge air temperature.

If the conditions for performing the automatic stop have not been met, method 300 returns to 302 to continue to monitor operating conditions. If the conditions for performing the automatic stop have been met, method 300 proceeds to 306 to shut down the engine. The engine may be shut down by stopping fuel injection and spark ignition, for example. At 308, the predicted cylinder air amount of the next intake stroke is determined. The air may be the intake air that will be inducted into a cylinder during the next unfired intake stroke performed by the engine, such as during cranking to initiate a subsequent engine restart. The air amount may be the volume of the charge air determined by a predicted MAP at intake valve closure of the next engine cycle.

At 310, the amount of water-containing fluid that is equivalent to the volume of the air is determined, and at 312, the amount of fluid that can be vaporized by an intake valve is determined. The amount of fluid that can be vaporized by the intake valve is dependent on the temperature of the valve, as calculated above. For example, the latent heat absorbed by the valve when the injected fluid is vaporized may be determined. If the starting valve temperature cannot absorb all the latent heat produced during the vaporization of the fluid, then not all the fluid will be vaporized. Based on the starting temperature of the valve and the properties of the fluid, it may be determined how much fluid can be vaporized. While the above calculations are based on a single cylinder and intake valve, the cylinder air amount and intake valve temperature may be calculated for each cylinder. In other embodiments, the air amount and valve temperature may be calculated only for the cylinder expected to receive the injected water-containing fluid. The cylinder that receives the injection of water-based fluid may be determined based on a position of the engine at shut-down, such that the cylinder in a desired position (e.g., the exhaust stroke) at the subsequent restart is selected to receive the injected fluid.

At 314, method 300 judges if an engine restart request has been received. The engine restart request may be based on accelerator and/or brake pedal position, for example by reading a pedal position sensor, to determine whether the accelerator pedal has been engaged, and/or a brake pedal has been released, and/or the request may be determined based an estimated torque requested by the driver being above a predetermined threshold. If the restart request has not been received, method 300 loops back to continue to monitor for whether the restart request has been received. If the restart request has been received, method 300 proceeds to 316 to inject the water-based fluid onto a closed intake valve. The fluid may be injected from a port injector, such as injector 170 of FIG. 1.

As indicated at 318, the amount of water-containing fluid to be injected may be based on the latent heat that the intake valve can absorb and the volume of air estimated to be inducted the cylinder, as determined above. For example, the amount of fluid injected may be equal to the amount of air that is to be inducted to the cylinder. However, if the valve is not hot enough to vaporize all the fluid, a smaller amount of fluid may be injected. The intake valve onto which the fluid is injected may be selected based on the position of the engine. For example, the intake valve of the cylinder about to enter the intake stroke may be selected, as indicated at 320. The injected fluid may be passed to the catalyst while the engine is cranking, as indicated at 322. Thus, the injected fluid is vaporized upon contacting the intake valve. In response to the restart request, the engine may begin cranking, and when the intake valve opens on a subsequent intake stroke, the vaporized fluid may be inducted to the cylinder and exhausted to the exhaust passage and the catalyst.

At 324, combustion is initiated in order to start the engine. This may include not fueling the cylinder that received the fluid until after the intake stroke and a subsequent exhaust stroke have been performed, as indicated at 326. In this way, the vaporized fluid may be passed to the catalyst without interfering with engine combustion. Combustion may be started in another cylinder after the vaporized fluid has been inducted, or it may be initiated in the cylinder that has received the fluid. Fuel may be injected to the engine via a direct injector, or via a port injector.

Thus, the method of FIG. 3 provides for injecting a non-fuel, water-containing fluid onto a hot, closed intake valve to displace the air that would be inducted to the cylinder during a subsequent intake stroke. The amount of fluid that is equivalent to the volume of air to be inducted to the cylinder may be injected, unless the intake valve is not hot enough to fully vaporize the fluid. If the valve cannot vaporize all the fluid, a smaller amount of fluid may be injected. However, if the valve is too cool to vaporize enough fluid to condition the catalyst as desired (e.g., deplete a desired amount of oxygen from the catalyst and/or provide a desired amount of water to the catalyst), the engine stop may not be performed. In another example, if a sufficient amount of fluid cannot be vaporized, fuel may be injected to the cylinder in an amount to displace the desired amount of air. The fuel may be passed to the catalyst uncombusted. In a further example, if the valve is too cool to vaporize the fluid, the fluid may be injected earlier (e.g., prior to or during engine shut-down), such that a pocket of oxygen-depleted air reaches the catalyst during the engine stop. This may reduce the oxygen saturation of the catalyst during a subsequent restart.

Further, while method 300 describes injection of the water-based fluid onto an intake valve of one cylinder, multiple injections to multiple cylinders are possible. For example, it may be desired to displace oxygen from two cylinders in order to bring the catalyst to a state sufficient to control emissions to a desired level. In such a case, the water-containing fluid may be injected onto the intake valve of two separate cylinders, and after both cylinders have inducted the vaporized fluid and have either exhausted it to the catalyst, or are about to exhaust it to the catalyst, then combustion may be initiated in another cylinder.

While method 300 describes injecting the fluid in response to a received engine restart request but before the engine begins cranking, other injection times are possible. For example, the fluid may be injected during engine deceleration following the automatic stop, or during a period of engine rest prior to receiving the restart request. In another example, the fluid may be injected once engine cranking begins, but before combustion occurs.

Figure 4:
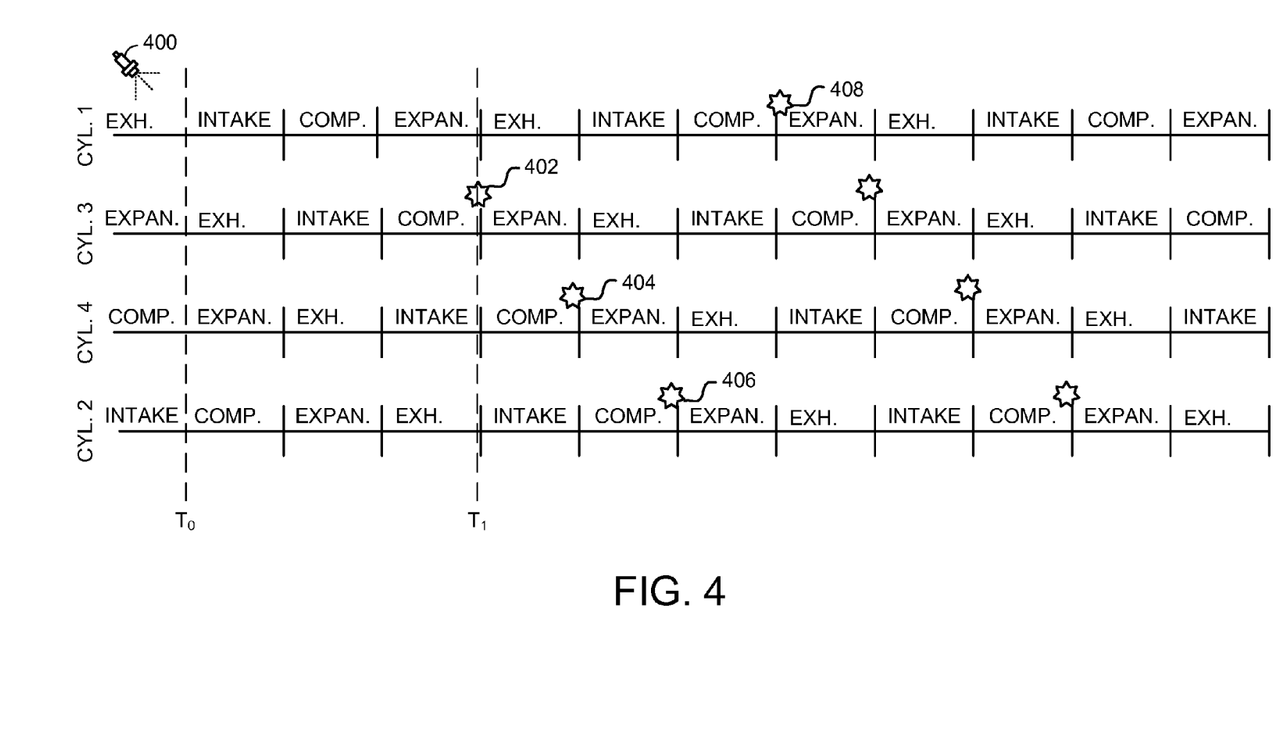
FIG. 4 is an example plot of signals of interest during a simulated engine start.

Referring to FIG. 4, an example plot of a simulated engine start sequence by the method of FIG. 3 is shown. Time begins on the left side of the plot and increases to the right side of the plot. The illustrated sequence represents a start of a non-limiting four cylinder four cycle engine. In this example, the vertical markers between cylinder position traces CYL. 1-4 represent top-dead-center or bottom-dead-center for the respective cylinder strokes, and there are 180 crankshaft degrees between each vertical marker.

The first plot from the top of the figure represents position of cylinder number one. And, in particular, the stroke of cylinder number one as the engine crankshaft is rotated. To the left of $T_0$, the engine is stopped and at rest. At $T_0$, the engine crankshaft begins to rotate from torque provided by a starter motor. The starter motor may be activated in response to an automatic start request, as described above. Strokes of cylinder 1-4 are labeled according to the engine position that the engine assumed at engine stop. For example, cylinder number one is shown on an exhaust stroke at engine stop before time $T_0$.

Prior to initiating combustion during the automatic start, a water-containing fluid may be injected onto a closed intake valve of one of the cylinders of the engine. The water-containing fluid will be vaporized by the heat of the intake valve, and the vaporized fluid may then be inducted into the cylinder and eventually passed to the catalyst. As shown in FIG. 4, fluid is injected to the intake valve of cylinder one prior to time $T_0$, as indicated by arrow 400. As cylinder one is about to enter the intake stroke, the fluid may have time to vaporize, but not dissipate, before being inducted to the cylinder. However, the fluid may be injected to other suitable cylinders.

After $T_0$, the engine rotates and cylinder number one enters the intake stroke followed by the compression, expansion, and exhaust strokes. The cylinder cycle for cylinder number one then repeats. For a four stroke engine, a cylinder cycle may be 720°, the same crankshaft interval for a complete cycle of the engine. However, fuel is not injected to cylinder one until after the first exhaust stroke after injecting the fluid has been performed, to allow for the vaporized fluid to pass to the catalyst. Thus, air is inducted through cylinder one during cranking of the engine and subsequent combustion in other cylinders, but combustion does not occur in cylinder one until the following compression stroke.

The second cylinder position trace from the top of the figure represents the position and stroke for cylinder number three. As explained previously, the fueling of cylinder one may be delayed to induct the vaporized fluid into the cylinder and to the exhaust in order to displace air reaching the cylinder. Thus, combustion may be initiated in the next cylinder in the firing order. Since the combustion order of this particular engine is 1-3-4-2, the first combustion event from engine stop occurs in cylinder three. The star at label 402 indicates the first ignition event for the first combustion event since engine stop. The ignition may be initiated by a spark plug or by compression. In this sequence, cylinder number three valves are open for at least a portion of the intake stroke to provide air to the cylinder. Fuel may be injected to the engine cylinders by port or direct injectors. The fuel and air mixture is compressed and ignited during the compression stroke. Peak cylinder pressure may occur at top-dead-center of compression stroke or during the expansion stoke. Thus, due to the combustion initiated in the cylinder, the engine is started following time $T_1$.

It should be noted that engine position may be determined at the time of engine stop by tracking engine position as spark and fuel are deactivated. In one embodiment, when the engine is substantially stopped, engine position is determined and stored to memory for retrieval during the next engine start. In another embodiment, engine position may be determined at engine start after the engine begins to rotate by sensing camshaft and crankshaft positions.

The third cylinder position trace from the top of the figure represents the position and stroke for cylinder number four. Star 404 represents the initiation of the first combustion event for cylinder number four after engine stop and the second combustion event from the engine stop.

The fourth cylinder position trace from the top of the figure represents the position and stroke for cylinder number two. Star 406 represents the initiation of the first combustion event for cylinder number two after engine stop and the third combustion event from the engine stop. Combustion is then initiated in cylinder one, represented by start 408.

It should be noted that the first cylinder to combust an air-fuel mixture can vary depending on the engine stopping position and the method of determining engine position. In some embodiments fuel may not be delivered to one or more engine cylinders until engine position is established. In other embodiments, fuel may be delivered before or as soon as the engine begins to rotate without regard to the engine stopping position. The engine stopping position may also be used to determine which cylinder or cylinders will receive an injection of water-containing fluid. For example, the number of cylinders receiving the water-containing fluid may vary based on engine position, wherein in a first engine position, one cylinder may receive an injection of water-containing fluid, while in a second engine position, two cylinders may receive an injection of water-containing fluid. The engine position may be determined upon shut-down, and based on the engine position, a cylinder may selected as the first cylinder to fire (the selected cylinder may be the first cylinder in a position to fire, based on undergoing an intake stroke with sufficient air induction, for example). Depending on the selected cylinder, one or more different cylinders may be selected to receive the water-containing fluid, if the cylinders will undergo an intake stroke prior to the initiation of combustion. Further, the number of cylinders receiving the fluid injection may vary based on the condition of the catalyst, e.g., if the catalyst is fully saturated with oxygen, two cylinders may receive the fluid injection, while if the catalyst is only partially saturated with oxygen, one cylinder may receive the fluid injection.

Figure 5:
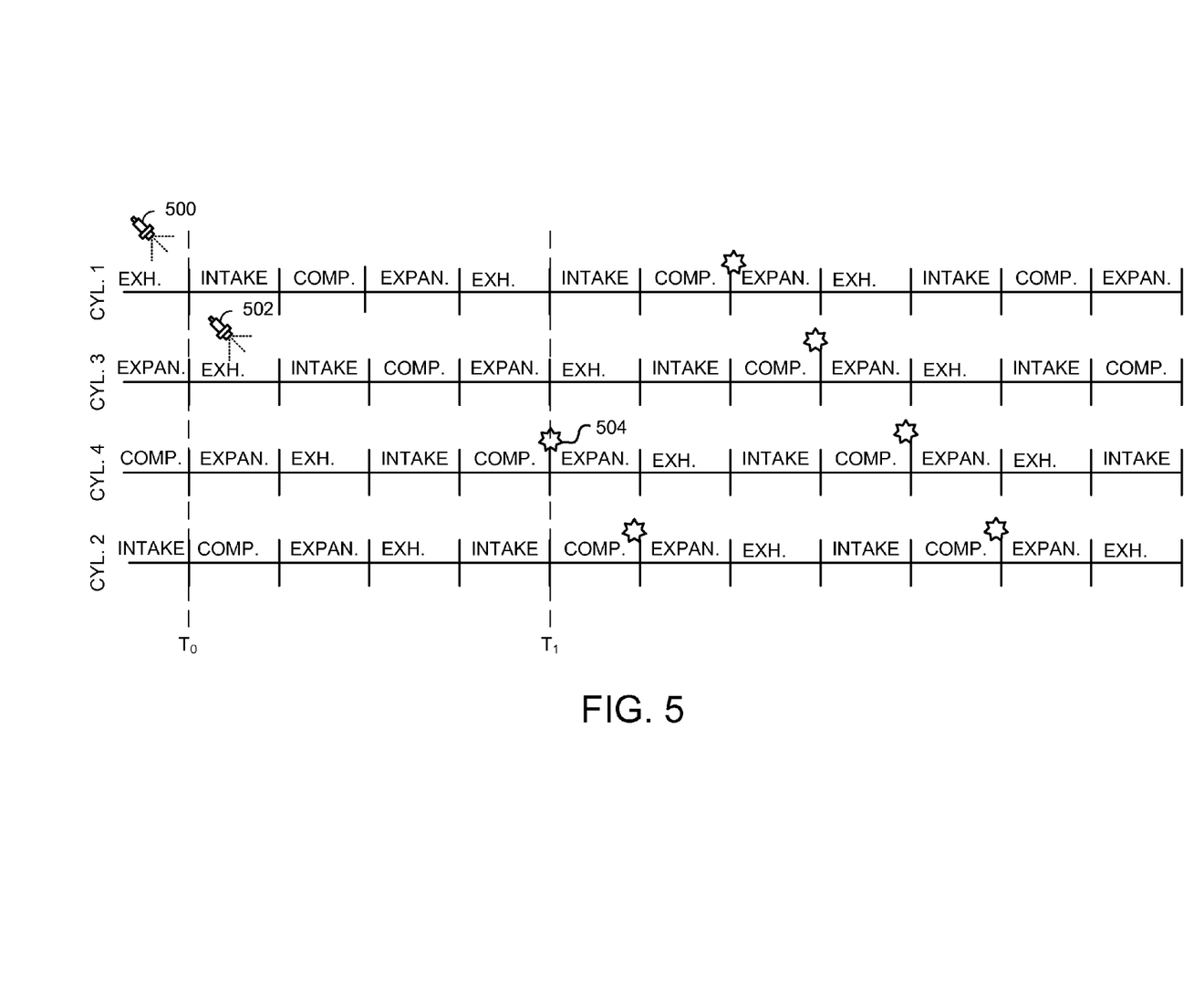
FIG. 5 is another example plot of signals of interest during a simulated engine start.

FIG. 5 shows another example plot of a simulated engine start sequence by the method of FIG. 3. Similar to FIG. 4, time is illustrated along the horizontal axis, and the engine strokes and combustion events of CYL. 1-4 are illustrated. FIG. 5 illustrates an example engine start where two cylinders are receiving an injection of water-based fluid. A first injection 500 to cylinder one prior to its intake stroke is illustrated. This injection may occur prior to engine cranking, which starts at time $T_0$. A second injection 502 to cylinder three is illustrated during engine cranking, when cylinder three is in the exhaust stroke. However, each cylinder may receive an injection at substantially the same time, such as prior to the intake stroke of cylinder one. To allow both cylinders to exhaust their contents to the catalyst prior to combusted exhaust reaching the catalyst, combustion may be initiated in cylinder four, as depicted by star 504, and as such the engine starts following time $T_1$. Thus, in FIG. 5, cylinder four may be selected as the first cylinder to undergo combustion, based on the position of the engine at shut-down. As both cylinders one and three will undergo an intake stroke prior to the initiation of combustion, each may receive an injection of water-containing fluid. However, if cylinder three is selected as the first to fire, but injection to multiple cylinders is desired, combustion initiation may be delayed and combustion initiated at cylinder four to allow time for injection to both cylinders one and three.

In one example, a method for an engine comprises during an automatic stop, injecting a water-containing fluid onto a closed intake valve of a cylinder while the engine is at rest; and on a subsequent restart, fueling the cylinder after at least one intake stroke and subsequent exhaust stroke are performed in the cylinder. The water-containing fluid may be vaporized in response to contacting the closed intake valve. The vaporized water-containing fluid may be passed to the exhaust prior to initiating combustion in the cylinder. Prior to performing the automatic stop, a temperature of the intake valve may be determined, and if the temperature is below a threshold, the automatic stop may not be performed.

An amount of the injected water-containing fluid may be based on a temperature of the intake valve and a volume of air predicted to enter cylinder during the intake stroke of the subsequent restart. Injecting the water-containing fluid onto the closed intake valve of the cylinder while the engine is at rest may further comprise injecting the water-containing fluid in response to an engine start request. The engine may be restarted by injecting fuel and initiating combustion in a second, different cylinder after the injection of the water-containing fluid. The second, different cylinder may be selected based on engine position at shut-down, and/or based on the oxygen storage state of the catalyst.

In another example, a method comprises during select conditions, stopping an engine; in response to a subsequent engine restart request, displacing a volume of air to be inducted to a cylinder with vaporized water-containing fluid; and exhausting the vaporized water-containing fluid to a catalyst prior to initiating combustion in the cylinder.

The select conditions may comprise an intake valve of the cylinder being above a threshold temperature and an automatic engine stop condition of the engine being met. The automatic engine stop condition may be based on one or more of an engine speed, engine load, and a brake pedal position. Displacing the volume of air inducted to the cylinder with vaporized water-containing fluid may comprise injecting water-containing fluid to a closed intake valve of the cylinder. An amount of the water-containing fluid to inject may be determined based on a temperature of the intake valve and a volume of the air to be inducted to the cylinder.

Determining the amount of the water-containing fluid to inject based on the temperature of the intake valve and the volume of the air may include: determining a first amount of the water-containing fluid that is equivalent to the volume of the air; determining if the temperature of the intake valve is high enough to vaporize the first amount of water-containing fluid; if the temperature is high enough to vaporize the first amount of water-containing fluid, then selecting the first amount as the amount of the water-containing fluid to inject; and if the temperature is not high enough to vaporize the first amount of water-containing fluid, then selecting a second, lower amount of water-containing fluid to inject.

Fuel injection to the cylinder may be delayed until at least after the vaporized water-containing fluid has been exhausted to the catalyst. The engine may be restarted by injecting fuel and initiating combustion in a second, different cylinder after the displacing of the volume of the air. The subsequent restart request may be based on brake pedal position and accelerator pedal position.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine, comprising:
   during an automatic stop, injecting a water-containing fluid onto a closed intake valve of a cylinder while the engine is at rest, wherein the water-containing fluid is vaporized in response to contacting the closed intake valve;
   on a subsequent restart, fueling the cylinder after at least one at least partial intake stroke and subsequent exhaust stroke are performed in the cylinder; and
   passing the vaporized water-containing fluid to the exhaust prior to initiating combustion in the cylinder.

2. The method of claim 1, further comprising prior to performing the automatic stop, determining a temperature of the intake valve, and if the temperature is below a threshold, not performing the automatic stop.

3. The method of claim 1, wherein injecting the water-containing fluid onto the closed intake valve of the cylinder while the engine is at rest further comprises injecting the water-containing fluid in response to an engine start request.

4. The method of claim 1, further comprising restarting the engine by injecting fuel and initiating combustion in a second, different cylinder after the injection of the water-containing fluid.

5. A method, comprising:
   during select conditions, stopping an engine;
   in response to a subsequent engine restart request, displacing a volume of air to be inducted to a cylinder with vaporized water-containing fluid; and
   exhausting the vaporized water-containing fluid to a catalyst prior to initiating combustion in the cylinder.

6. The method of claim 5, wherein the select conditions comprise an intake valve of the cylinder being above a threshold temperature and an automatic engine stop condition of the engine being met.

7. The method of claim 6, wherein the automatic engine stop condition is based on one or more of an engine speed, engine load, and a brake pedal position.

8. The method of claim 5, wherein displacing the volume of air inducted to the cylinder with vaporized water-containing fluid comprises injecting water-containing fluid to a closed intake valve of the cylinder.

9. The method of claim 8, further comprising determining an amount of the water-containing fluid to inject based on a temperature of the intake valve and a volume of the air to be inducted to the cylinder.

10. The method of claim 9, wherein determining the amount of the water-containing fluid to inject based on the temperature of the intake valve and the volume of the air includes:
    determining a first amount of the water-containing fluid that is equivalent to the volume of the air;
    determining if the temperature of the intake valve is high enough to vaporize the first amount of water-containing fluid;
    if the temperature is high enough to vaporize the first amount of water-containing fluid, then selecting the first amount as the amount of the water-containing fluid to inject; and
    if the temperature is not high enough to vaporize the first amount of water-containing fluid, then selecting a second, lower amount of water-containing fluid to inject.

11. The method of claim 5, further comprising delaying fuel injection to the cylinder until at least after the vaporized water-containing fluid has been exhausted to the catalyst.

12. The method of claim 5, further comprising restarting the engine by injecting fuel and initiating combustion in a second, different cylinder after the displacing of the volume of the air.

13. The method of claim 5, wherein the subsequent restart request is based on brake pedal position and accelerator pedal position.

14. A method for an engine, comprising:
    during an automatic stop, injecting a water-containing fluid onto a closed intake valve of a cylinder while the engine is at rest; and
    on a subsequent restart, fueling the cylinder after at least one at least partial intake stroke and subsequent exhaust stroke are performed in the cylinder, wherein an amount of the injected water-containing fluid is based on a temperature of the intake valve and a volume of air predicted to enter the cylinder during the intake stroke of the subsequent restart.

15. The method of claim 14, wherein injecting the water-containing fluid comprises injecting the water-containing fluid from a first, port injector, and wherein fueling the cylinder comprises injecting fuel from a second, direct injector.

16. The method of claim 14, wherein injecting the water-containing fluid comprises injecting the water-containing fluid from a port injector, and wherein fueling the cylinder comprises injecting fuel from the port injector.

17. The method of claim 14, wherein the water-containing fluid is vaporized in response to contacting the closed intake valve, and further comprising passing the vaporized water-containing fluid to the exhaust prior to initiating combustion in the cylinder.

18. The method of claim 14, wherein determining the amount of the water-containing fluid to inject based on the temperature of the intake valve and the volume of the air includes:
    determining a first amount of the water-containing fluid that is equivalent to the volume of the air;
    determining if the temperature of the intake valve is high enough to vaporize the first amount of water-containing fluid;
    if the temperature is high enough to vaporize the first amount of water-containing fluid, then selecting the first amount as the amount of the water-containing fluid to inject; and
    if the temperature is not high enough to vaporize the first amount of water-containing fluid, then selecting a second, lower amount of water-containing fluid to inject.

* * * * *